United States Patent [19]

Anderson et al.

[11] Patent Number: 4,521,321
[45] Date of Patent: Jun. 4, 1985

[54] CONVEYOR TRACK LUBRICANT COMPOSITION EMPLOYING PHOSPHATE ESTERS AND METHOD OF USING SAME

[75] Inventors: Patricia A. Anderson, Acton; Roger G. Hagens, Hamilton; Dianne M. Roden, Waterdown, all of Canada

[73] Assignee: Diversey Wyandotte Inc., Mississauga, Canada

[21] Appl. No.: 531,042

[22] Filed: Sep. 12, 1983

Related U.S. Application Data

[63] Continuation-in-part of Ser. No. 373,985, May 3, 1982, abandoned.

[51] Int. Cl.$^3$ ............................................. C10M 1/46
[52] U.S. Cl. .................................. 252/49.3; 252/32.5; 252/50; 252/51.5 R; 252/52 R
[58] Field of Search .................... 252/32.5, 49.3, 50, 252/51.5 R, 52 R

[56] References Cited

U.S. PATENT DOCUMENTS 3,277,001 10/1966 Fischer et al. ...................... 252/32.5
3,310,489  3/1967 Davis et al. ......................... 252/32.5
3,496,104  2/1970 Shimada et al. .................... 252/32.5
3,574,100  4/1971 Wetmore et al. ................... 252/32.5
3,718,588  2/1973 Bellos et al. ........................ 252/32.5
4,292,182  9/1981 Jahn ..................................... 252/8.6

*Primary Examiner*—Jacqueline V. Howard
*Attorney, Agent, or Firm*—Marshall, O'Toole, Gerstein, Murray & Bicknell

[57] ABSTRACT

It has been found that a conveyor system can be lubricated with dilute [$1.0 \times 10^{-3}$M] aqueous solutions of a partially neutralized mono phosphate ester of the formula:

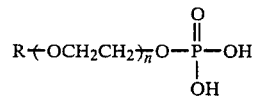

wherein n has a value 0 to 3 and R is a $C_{12}$ to $C_{20}$ saturated or partially unsaturated linear alkyl group, or a mixture of such groups. The use of a synergist such as a long-chain alcohol, a fatty-acid derived amine oxide, or urea improves the properties of the lubricant compositions.

15 Claims, No Drawings

CONVEYOR TRACK LUBRICANT COMPOSITION EMPLOYING PHOSPHATE ESTERS AND METHOD OF USING SAME

This is a continuation-in-part of U.S. application Ser. No. 373,985, filed May 3, 1982, now abandoned.

BACKGROUND OF THE INVENTION

The present invention relates generally to water-based lubricant compositions and a method of using such compositions. More particularly, the invention discloses aqueous compositions containing a long chain phosphate ester which are useful for the lubrication of continuously-moving conveyor systems, particularly conveyor systems used in the packaging of materials intended for human consumption.

Continuously-moving conveyor systems employed in food and beverage packaging operations require both cleansing and lubrication to insure that the systems function properly in moving items between packaging stations. For example, in those conveyor systems employed in bottling and capping operations, a clean and properly lubricated conveyor surface permits stoppage of the bottles during the filling and capping operations while the conveyor track continues to move underneath. If the track is not clean or does not have the proper lubricity, the containers may be knocked over or fail to stop moving, resulting both in bottle breakage and in disruption of the bottling line. These cleansing and lubricating functions are customarily accomplished by circulating an aqueous dispersion or solution of a water-based material across the track surface.

Various surface active agents have been employed as lubricants in food packaging processes, including long chain fatty acid soaps, sulfonated oils, and alkanolamides. Of particular interest to the present invention is the water-soluble agent of U.S. Pat. No. 3,574,100 which claims a track lubricant composition comprising a mixture of an imidazoline derivative and an alkali metal salt of the phosphate esters of oleyl alcohol ethoxylate.

The specific phosphate ester salt disclosed in U.S. Pat. No. 3,574,100 is a material manufactured by General Aniline and Film Corporation under the trade name, Gafac GB520. Gafac GB520 is the partial sodium salt of a mixture of mono- and di-alkyl phosphate esters derived from an oleyl alcohol polyethoxylate having eight to nine ethoxy groups, together with 35 percent of unreacted oleyl alcohol ethoxylate, i.e., $$H_3C-(CH_2)_7-CH=CH-(CH_2)_7-CH-(O-CH_2CH_2)_{8-9}-OH.$$

The mole ratio of phosphate diester to phosphate monoester in the Gafac GB520 material is greater than 3 to 1.

DESCRIPTION OF THE INVENTION

The novel lubricants of the present invention are aqueous compositions, at least partially neutralized with a base, preferably comprising two active components. The first of these active ingredients is a mono alkyl phosphate ester of the formula

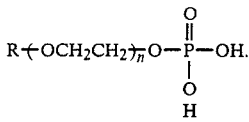

The second of the active ingredients is a synergist taken from the group:

(A) an alcohol of the formula

(B) an amine oxide of the formula

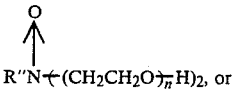

or (C) urea.

The lubricant compositions also contain minor amounts of di alkyl phosphate ester and phosphoric acid. In the above formulae R and R' are linear saturated primary alkyl groups, $C_{14}$ through $C_{18}$, or linear partially unsaturated primary alkylene groups, $C_{16}$ through $C_{20}$. R and R' can also comprise a mixture of saturated or unsaturated alkyl groups $C_{12}$ through $C_{20}$, having an average chain length in the range $C_{13}$ through $C_{18}$. R" is a mixture of saturated and unsaturated alkyl groups $C_8$ through $C_{18}$ having an average chain length $C_{12}$ through $C_{18}$ (i.e., products derived from fatty acids such as coco oil and tallow). The value of m and n can be zero through three.

We have discovered that while lubricating compositions employing phosphate monoesters as the sole active ingredient exhibit good lubricity, the use of an alcohol, an amine oxide, or a urea synergist with the phosphate ester greatly improves the performance of the lubricant composition, particularly in the area of durability. Although the addition of other materials, such as surfactants, can improve the lubricant formulations, excellent compositions can be prepared wherein the sole active components comprise a neutralized aqueous dispersion of a two-component system containing a monophosphate ester and one of the synergist compositions described above.

These lubricant compositions exhibit excellent lubricity at concentrations as low as 0.01 percent. The use of higher concentrations, (i.e., 0.05 to 0.1 percent) is generally preferred, however, because it results in greater durability for the applied material.

The phosphate esters of the present invention can be prepared in a conventional manner. For example, a $C_{14}$–$C_{15}$ triethoxyphosphate was synthesized by reacting a $C_{14}$–$C_{15}$ linear primary alcohol mixture (Neodol ®45) with three moles of ethylene oxide and then phosphorylating the resultant ethoxylate with polyphosphoric acid at a temperature of approximately 65°–80° C. The product comprised monophosphate ester, unreacted ethoxylated alcohol, phosphoric acid, and diester. Other methods of obtaining phosphate esters are illustrated in the prior art, i.e., U.S. Pat. Nos. 1,970,578, 2,174,271, 2,167,326 and 3,033,889.

It is generally desirable to limit the formation of diester product in the reaction mixture. The diesters are approximately twice the molecular weight of the monoesters and do not add to the system's lubricating properties. Thus, based on cost considerations, the diester content should be kept to a minimum, preferably less than 15 percent of the active mono ester ingredient. This can be accomplished by employing an excess of phosphoric acid in the reaction. If desired, additional amounts of long-chain alcohol or alcohol ethoxylate can be added to the product after cooling.

In view of the fact that the compositions of the present invention typically contain free phosphoric acid as well as the acidic monophosphate ester, the lubricant compositions would have an undesirably low (acid) pH were they not partially neutralized. Moreover, it has been found that neutralization results in better dispersibility of the compositions in water. Neutralization can be accomplished by the addition of any suitable base, but the use of $NH_3$, $NH_4OH$, or a basic aminofunctional material is generally preferred.

Although the lubricity of the ester compositions remains relatively constant over a range of pH values, the durability of the composition peaks at a pH $\cong$5-6, the pK range for neutralization of the first hydroxyl group in mono alkyl phosphate esters. If the neutralization is continued to a pH=9 (the pK range for the second hydroxyl neutralization), there is a fall-off in product durability. Thus optimum properties in terms of durability are obtained with partial neutralization, whereby the resultant composition has a pH in the range 5.0 to 7.0, ideally pH=6.0. However, good lubricity can be obtained with compositions of higher pH values—in the range 6.5 to 10. Some applications may warrent a partial sacrifice of product durability in order to obtain the benefit of a mildly basic lubricant. For example, formulations having a basic pH can resist acidic beverage spills (e.g., beer) without any major deterioration in lubricity. Moreover, basic (pH 8.0 to 10.0) compositions are generally desirable where it is necessary to incorporate a sequestering agent in the lubricant to overcome problems resulting from water hardness.

As previously indicated, the long chain saturated alkyl or partially unsaturated alkylene substituent groups of the phosphate esters may contain up to three ethoxy groups in the chain. The presence of these groups increases the dispersibility of the ester in water but at some sacrifice in lubricity. Therefore, while the lubricant performance of a typical monophosphate ester increases with the length of the alkyl chain, saturated alkyl groups longer than $C_{15}$ tend to be too insoluble to be easily formulated, absent some degree of ethoxylation. Increasing the ethylene oxide content increases solubility but reduces lubricating ability.

A preferred ester representing a compromise between lubricating performance and solubility (for saturated R groups) is the phosphate ester,

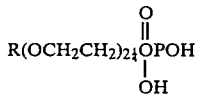

where R is a 50:50 mixture of $C_{14}H_{29}$— and $C_{15}H_{31}$—alkyl groups.

The performance of the lubricant compositions is improved by the presence of a free long-chain alcohol, a long-chain alcohol ethoxylate, a fatty-acid-derived amine oxide, or urea. Although these additives provide no lubricity by themselves, their presence in the lubricating formulation serves as a synergist, improving both the lubricity and, in particular, the durability of the compositions. While even a minor amount of these additives serves to improve the properties of the lubricants, optimum results are obtained when the long-chain monoester/synergist ratio is in the range of 1:1.5 on a molar basis.

If an alcohol is used as the synergist, the alcohol can be the reactant precursor of the phosphate ester, and thus R and R' will be the same. However, this identity is not necessary and desirable lubricant compositions can be formulated utilizing various combinations of alcohol and phosphate ester which differ either in the length or in the nature (saturated/unsaturated, ethoxylated/non-ethoxylated) of the linear long-chain substituant group.

The amine oxide synergist employed in certain species of the invention is an ethoxylated polyoxyethylene fatty amine, characteristically derived from a natural product such as coco oil, tallow, soybean oil, and the like. Particularly useful compounds include bis(2-hydroxyethyl)cocoamine oxide and bis(2-hydroxyethyl)tallow amine oxide.

The inclusion of a sequesterant such as ethylene diamine tetra acetic acid (EDTA) in the lubricant composition renders the phosphate ester formulations resistant to the formation of insoluble precipitates when used in hard water formulations.

The phosphate-ester-containing lubricants are generally applied at very low levels of concentration, i.e., between about $1.0 \times 10^{-3}$ and $3.0 \times 10^{-3}M$, based on the monophosphate ester. It is therefore desirable to supply the lubricants in the form of liquid concentrates which can be further diluted with water prior to use. Concentrates containing about 10 percent by weight of monophosphate ester can be formulated by blending the phosphate ester, synergist and other desired ingredients at elevated temperatures (30°–50° C.) in an isopropanol/water mixture and neutralizing to a pH of 5.0-6.5 with a base. Lower molecular weight phosphate esters so formulated will remain stable at room temperature. Higher molecular weight concentrates may solidify when cooled to ambient temperature, but can be re-liquified by heating to 30°–40° C. The concentrates are diluted prior to use, typically in the ratio one part concentrate to 100 to 200 parts water.

The compositions are applied to the surface of moving conveyor systems so that the surface of the conveyor does not become dry. This may be accomplished by passing the conveyor through a dip or trough containing a dilute solution of the lubricant, by brushing or roller coating the lubricant composition on the surface of the conveyor, or by other conventional means. The preferred method of application, however, utilizes spray nozzles spaced along the conveyor track to ensure the proper degree of lubricity. No matter how the material is applied, it is important that the conveyor system remain consistently wet.

As noted above, the lubricant compositions may be improved by use of surfactants and/or sequesterants. Preferred surfactants are long-chain anionic materials such as the sodium salt of sulfonated oleic acid.

Should the lubricant concentrate be diluted with hard water, a highly-dispersed suspension may form, giving the product a cloudy appearance. The fine suspension may in time agglomerate and accumulate in the spray nozzles causing them to block. The use of a sequestering agent is desirable to control the hardness. In view of the fact that sequestering agents such as EDTA perform most efficiently at pH of 8.0 or more, it may be desirable to supply the lubricant concentration at a sufficiently high pH (8.0→10) to enable the sequestering agent to operate at maximum efficiency. As has been previously mentioned, however, this increase in pH may result in some loss in the product's durability.

The lubricity and durability of the lubricant compositions reported in the following examples was measured on a pilot test track, approximately 19 cm wide by 305 cm long. The track, a slat conveyor manufactured of 304 stainless steel, was operated at a speed of 40 cm/sec. Friction measurements were measured with a 0–5 pound precision load cell manufactured by Transducers, Inc. (Model C462). The output from the load cell was connected to a Sigma variable speed strip chart recorder, permitting measurements of coefficient of friction ($\mu$) vs. time.

A constant load, consisting of eight filled bottles connected to the load cell by a loop of fine wire, was utilized in the experiments. Lubricant compositions were applied in spurts to the test track with a feed pump, via a fan spray nozzle. The pump and nozzle could be adjusted to vary both the frequency of the spurts and the volume of material delivered. In each of the following examples a spurt rate of 36/minute and a solution volume of 32 mL/minute was employed.

The test was initiated by activating the feed pump and starting the test track and recorder in motion. The measured coefficient of friction was observed to drop over a period of time to a constant equilibrium value ($\mu$), the value depending on the lubricity of the applied material. Because lubricity has an inverse relationship to friction, the lower the value of $\mu$, the better the lubricant.

The pilot test track was also used to measure the durability of the lubricant compositions. This was accomplished by replacing the intermittant stream of lubricant applied to the track with a constant stream of water. At the same time, a weighted fiberglass cloth (~5000 gms, width ~11 cm) was placed on the track to increase the wear rate. The time required for the coefficient of friction to increase from the lubricated equilibrium value to the original friction value represents the durability of the test lubricant. The greater the time, the better the durability.

The reported data for coefficients of friction represent measurements taken five minutes after the initial activation of the feed pump and test track to ensure that a constant equilibrium had been obtained. Immediately after making this measurement, the flow of lubricant was replaced with a water stream and the durability test was commenced.

In interpreting the following data, the optimum products are those which exhibit both low equilibrium coefficients of friction and high durability times. Except as otherwise indicated, all formulations were diluted in distilled water to $2.2 \times 10^{-3}$M based on the weight of the ester. All ratios are expressed in terms of weight, unless otherwise indicated.

Finally, although the following examples illustrate the present invention, they should not be construed as limiting the invention to their details.

TABLE I

| PHOSPHATE ESTER $2.2 \times 10^{-3}$M | RATIO OF ESTER TO SECONDARY COMPONENTS(S) | PILOT TRACK PERFORMANCE DUR/$\mu$ |
| --- | --- | --- |
| Ex 1A: $C_{12}$—$C_{15}OPO_3H_2$ | Isolated ester | 8 min/0.134 |
| Ex 1B: | 1:1.3$^+$ $C_{12}$—$C_{15}$ alcohol | 10 min/0.145 |
| Ex 2: $C_{12}$—$C_{15}(EtO)_3OPO_3H_2$ | 1:1 $C_{12}$—$C_{15}(EtO)_3OH$ | 6 min/0.147 |
| Ex 3A: $C_{14}$—$C_{15}OPO_3H_2$ | Before separation (1:1.1 $C_{14}$—$C_{15}OH$) | 16.5/0.12 |
| Ex 3B: | Isolated ester | 6/0.132 |
| Ex 3C: | 1:0.5 $C_{14}$—$C_{15}OH$ | 15/0.121 |
| Ex 3D: | 1:1 $C_{14}$—$C_{15}OH$ | 17/0.112 |
| Ex 3E: | 1:1 $C_{14}$—$C_{15}(EtO)_{2\frac{1}{4}}OH$ | 16/0.127 |
| Ex 3F: | 1:1 $C_{16}(EtO)_{10}OH$ | 4/0.136 |
| Ex 3G: | 1:1 $C_{18}OH$ | 27/0.104 |
| Ex 3H: | 1:0.5 $C_{18}OH$ | 13.5/0.123 |
| Ex 4A: Oleyl$(EtO)_2OPO_3H_2$ | Before separation (1:1.2 Oleyl $(EtO)_2OH$) | 16/0.123 |
| Ex 4B: | Isolated ester | 10/0.12 |
| Ex 4C: | 1:0.25 Oleyl $(EtO)_2OH$ | 13/0.122 |
| Ex 4D: | 1:0.5 Oleyl $(EtO)_2OH$ | 14/0.13 |
| Ex 4E: | 1:1 Oleyl $(EtO)_2OH$ | 14.5/0.128 |
| Ex 5: Gafac GB520 [(Oleyl $(EtO)_9O)_2PO_2H$:] Oleyl $(EtO)_9OPO_3H_2$ (molar ratio di to mono - 4:1 molar) | As received (esters plus 35% Oleyl $(EtO)_9OH$) | 3/0.22 |
| Ex 6A: $C_{14}$—$C_{15}(EtO)_{2\frac{1}{4}}OPO_3H_2$ | Ester: $C_{14}$—$C_{15}(EtO)_{2\frac{1}{4}}OH$: Sulfonate OA-5 (sodium salt of sulfonated oleic acid) 1:1:0.5 | 15.5/0.136* |
| Ex 6B: | Ester: $C_{14}$—$C_{15}(EtO)_{2\frac{1}{4}}OH$: Sulfonate OA-5 1:1:1 | 18/0.136 (fresh soln)* |
|  | Ester: $C_{14}$—$C_{15}(EtO)_{2\frac{1}{4}}OH$: Sulfonate OA-5 1:1:1 | 13/0.14 (4 day old soln)* |
| Ex 6C: | Ester: $C_{14}$—$C_{15}(EtO)_{2\frac{1}{4}}OH$: Sulfonate OA-5 1:0.5:0.5 | 15/0.145* |
| Ex 6D: | Ester: $C_{14}$—$C_{15}(EtO)_{2\frac{1}{4}}OH$: Sulfonate OA-5 1:0.1:0.5 | 15/0.151* |

TABLE I-continued

| PHOSPHATE ESTER 2.2 × 10$^{-3}$M | RATIO OF ESTER TO SECONDARY COMPONENTS(S) | PILOT TRACK PERFORMANCE DUR/μ |
|---|---|---|
| Ex 7: C$_{14}$—C$_{15}$(EtO)$_{2\frac{1}{4}}$OPO$_3$H | Aromox C/12 (bis(2-hydroxy ethyl) cocoamine oxide) 1:1 | 19/0.143* |
| Ex 8A: C$_{14}$—C$_{15}$(EtO)$_{2\frac{1}{4}}$OPO$_3$H | Urea 1:0.8 | 19/0.15 |
| Ex 8B: C$_{14}$—C$_{15}$(EtO)$_{2\frac{1}{4}}$OPO$_3$H | Urea 1:2 | 29/0.15 |
| Ex 9A: Oleyl (EtO)$_4$OPO$_3$H$_2$ (50:50 mono:di by weight) | Before separation (1:0.1 Oleyl (EtO)$_4$OH) | 12/0.145 |
| Ex 9B: | 1:1 Igepal CO-530 | 8/0.158 |
| Ex 9C: | 1:1 C$_{18}$OH | 13.5/0.136 |
| Ex 9D: | 1:1 Oleyl (EtO)$_2$OH | 12/0.158 |
| Ex 10A: Tallow (EtO)$_2$OPO$_3$H$_2$ | Before separation (51% Tallow (EtO)$_2$OH) | 16/0.125 |
| Ex 10B: | Isolated ester | 9/0.12 |
| Ex 10C: | 1:1 C$_{14}$—C$_{15}$(EtO)$_{2\frac{1}{4}}$OH | 15/0.12 |
| Ex 10D: | 1:1 C$_{18}$OH | 15/0.12 |
| Ex 10E: | 1:1 Stearyl (EtO)$_2$OH | 16/0.13 |

+All ratios are expressed in terms of weight of ester (1) to weight of added ingredient.
*Dispersed in 150 ppm tap water.

EXAMPLE I

C$_{12}$–C$_{15}$ non-ethoxylated monoester

A phosphated ester was prepared by reacting a C$_{12}$ to C$_{15}$ linear primary alcohol mixture with polyphosphoric acid at a temperature of approximately 72° C. Upon cooling the product was analyzed and found to contain 38.2 percent monoester, 11.5 percent H$_3$PO$_4$, 50.3 percent unreacted alcohol, and no measurable diester.

The phosphate ester was separated from the unreacted alcohol by dissolving approximately 25 g of the above product in 50 mL of warm isopropyl alcohol and stirring the mixture with heating until a clear solution was obtained. The pH of the solution was adjusted to approximately 6.5 by the addition of concentrated NH$_4$OH (dilute solutions should be avoided due to the ester's solubility in H$_2$O). This resulted in the formation of a white precipitate which was digested at 40° C. for 45 minutes. The solution was cooled to 20° C., filtered through a buchner funnel, washed with cold IPA, and the precipitate dried. The residue—the ammonium salts of the phosphate ester and polyphosphoric acid—was dissolved in water to form a 2.2×10$^{-3}$M lubricant composition based on the phosphate ester, and applied to the test track in the manner previously described. The durability and lubricity of the composition was measured and recorded. The results are set forth at Ex 1A in Table I.

A second sample of the phosphate ester/unreacted alcohol product of the first reaction was formulated into a lubricant without removal of the unreacted alcohol. This was accomplished by adding 25 g of material (38 parts ester:50 parts alcohol) to 250 ml of a 10/90 IPA/H$_2$O solution, and heating the mixture to 35° C., with stirring. The pH of the dispersion was adjusted to 6.5 by the addition of diethanol amine (DEA), and then diluted with distilled water to form a 2.2×10$^{-3}$M lubricant composition based on the phosphate ester. The composition was applied to the test track and its durability and lubricity measured and recorded. The results are set forth at Ex 1B in Table I.

EXAMPLE II

C$_{12}$–C$_{15}$ triethoxylated monoester

A commercially-available phosphated ester composition (Alkaphos-3, Alkaril Chemicals Ltd.), was formulated into a track lubricant composition. Analysis of the product as received revealed it to be a C$_{12}$–C$_{15}$ triethoxyphosphate and that its composition was 45 percent monoester, 10 percent phosphoric acid, 40 percent unreacted alcohol ethoxylate, and 5 percent diester.

Twenty-five (25) grams of the product was dispersed in 250 ml of a 10/90 IPA/H$_2$O solution, neutralized to pH 6.5 with DEA, and diluted to 2.2×10$^{-3}$M with distilled water in the same manner as the ester/alcohol material of Example 1. The results of the composition as a track lubricant are set forth at Ex 2 of Table 1.

EXAMPLE III

C$_{14}$C$_{15}$ non-ethoxylated monoester

A phosphated monoester was prepared from a C$_{14}$C$_{15}$ linear primary alcohol mixture by following the procedure of Example 1. Analysis revealed the product to contain 41.8 percent monoester, 10.7 percent H$_3$PO$_4$, 47.5 percent unreacted alcohol, and no measurable diester. A portion of the product was dissolved in 30/70 IPA/H$_2$O, neutralized to pH 6.5 with DEA, diluted to 2.2×10$^{-3}$M in distilled water and tested on the pilot track. The results appear at Ex 3A of Table I.

Another portion of the above product was treated so as to isolate the phosphate ester from the non-reacted alcohol in accordance with the separation step of Example 1. The isolated, partially neutralized ester/acid mixture was tested on the pilot track by itself (Ex 3B), and in combination with a number of long-chain alcohols and alcohol ethoxylates (Exs 3C–3H). In all cases, the C$_{14}$–C$_{15}$ phosphate ester-containing lubricant was diluted to 2.2×10$^{-3}$M, based on the ester content, prior to testing.

EXAMPLE IV

Oleyl diethoxy monoester

An oleyl alcohol diethoxylate was prepared by reacting oleyl alcohol [CH$_3$(CH$_2$)$_7$CH=CH(CH$_2$)$_7$CHOH]

with ethylene oxide in a 1 to 2 molar ratio. The reaction was carried out by charging the oleyl alcohol and a sodium hydroxide catalyst into an autoclave, heating the autoclave to 140° C., and gradually adding ethylene oxide gas. The pressure was maintained at 25 to 30 p.s.i. during the reaction.

The resultant oleyl alcohol diethoxylate was reacted with polyphosphoric acid by following the procedure of Example 1. Analysis revealed that product to be 42 percent phosphate monoester, 8 percent $H_3PO_4$, and 50 percent alcohol ethoxylate diester. A portion of the product was dissolved in 30/70 IPA/$H_2O$, neutralized to pH 6.5 with DEA, diluted to $2.2 \times 10^{-3}$M in distilled water and tested on the pilot track. The results appear at Ex 3A of Table I.

Another portion of the product was treated so as to isolate the phosphate ester from the alcohol in accordance with the separation step of Example 1. The isolated, partially neutralized ester/acid mixture was tested on the pilot track by itself (Ex 4B), and in combination with a number of long-chain alcohols and alcohol ethoxylates (Exs 4C–4E). In all cases the oleyl diethoxy phosphate-ester-containing lubricant was diluted to $2.2 \times 10^{-3}$M based on the ester content, prior to testing.

EXAMPLE V

Oleyl polyethoxy ester (Gafac GB520)

A commercially-available partially neutralized ethoxylated oleyl alcohol ester composition (Gafac GB520, GAF, Inc.) was formulated into a track lubricant. Analysis of the product as received revealed the material to be an aqueous dispersion containing a long-chain phosphate diester, a long-chain phosphate monoester and free oleyl alcohol ethoxylate. The analysis showed the product to be partially neutralized with NaOH.

The degree of ethoxylation of the oleyl alcohol alkylene substituent was determined to be between 8 and 9, and the ratio of phosphate diester to phosphate monoester to be in excess of 4 to 1. Unreacted ethoxylated alcohol was found to constitute approximately 35 percent by weight of the solids ingredients.

The GB520 was formulated into a $2.2 \times 10^{-3}$M track lubricant composition, based on the weight of the total ester. The results of the pilot track test utilizing this material are reported at Ex 5 of Table 1. As evident from these results, the composition exhibited poor durability and lubricity.

EXAMPLE VI $C_{14}$-$C_{15}$(—OEt—$2\frac{1}{4}$)

phosphate monoester plus surfactant

A lubricant composition was formulated wherein a surfactant was added to improve the hard-water stability of the composition. A phosphate ester of a $C_{14}$-$C_{15}$(EtO)$_{2\frac{1}{4}}$ alcohol ethoxylate was prepared in accordance with the procedure of Example IV. Analysis revealed the product to be 72.5 percent monoester, 9 percent diester, 12 percent phosphoric acid, and 6.5 percent unreacted alcohol ethoxylate.

An anionic surfactant—the sodium salt of sulfonated oleic acid, 50% active (Sulfonate OA5, Cities Service, Inc.)—was added to the ester/alcohol blend in various amounts, the mixture neutralized to a pH of 6.5 with DEA, and the neutralized products dispersed in 150 ppm tap water to form track lubricants ($2.2 \times 10^{-3}$M, based on ester). The results are recorded at Exs 6A–6D in Table I.

EXAMPLE VII $C_{14}C_{15}$(OEt)$_{2\frac{1}{4}}$ phosphate monoester plus amine oxide The $C_{14}C_{15}$(OEt)$_{2\frac{1}{4}}$ alcohol ethoxylate of Example VI was treated so as to isolate the mono-phosphate ester in accordance with the separation procedure of Example I. Ten Ten (10) grams of the monoester was dispersed in 75 grams of 2:13 IPA:$H_2O$, and titrated with $NH_4OH$ to a pH of 6.0. Five (5) grams of Aromox C/12, bis(2-hydroxyethyl)cocoamine oxide (Armak Industrial Chemicals), was added to the above solution to form a concentrate, and the material dispersed in tap water (100:1) to form a track lubricant ($2.2 \times 10^{-3}$M, based on ester). The results are recorded at Ex 7 of Table I.

EXAMPLE VIII $C_{14}$-$C_{15}$(OEt)$_{2\frac{1}{4}}$ phosphate monoester plus urea The $C_{14}C_{15}$(OEt)$_{2\frac{1}{4}}$ alcohol ethoxylate of Example VI was treated so as to isolate the mono-phosphate ester in accordance with the separation procedure of Example I. Ten (10) grams of the monoester was dispersed in 80 grams of 1:8 IPA:$H_2O$ and titrated with $NH_4OH$ to a pH of 6.0. A concentrate was formulated by dissolving 8 grams of urea in the above solution. The concentrate was diluted in distilled water (100:1) to form a track lubricant. The results are reported at EX 8A of Table I.

A second lubricant composition was prepared, as above, but employing a higher level of urea (20 grams). The results are recorded at Ex 8B of Table I.

EXAMPLE IX

Long chain alkylene phosphate esters were formulated into track lubricant compositions in accordance with the procedures of Example 1 through VIII. The results of the test of these compositions on a pilot test track are summarized in Table I, Exs 9 and 10.

EXAMPLE X

Effect of pH

In order to test the effect of pH on lubricant properties, a track lubricant concentrate was formulated as follows:

|  |  |  | % |
|---|---|---|---|
| Phosphate Ester | $C_{14}$—$C_{15}$ triethoxy monophosphate ester | 80% | 8.0 |
|  | $C_{14}$—$C_{15}$ triethonyl alcohol (nonionic) | 8% |  |
|  | phosphoric acid (free) | 12% |  |
| Nonionic Alcohol |  |  | 1.0 |
| Isopropanol |  |  | 12.0 |
| Urea |  |  | 15.0 |
| Water (soft) |  |  | 60.4 |
| Ethylene Diamine Tetra Acetic Acid Disodium.2H$_2$O |  |  | 1.0 |
| Methanolamine (MEA) or KOH* |  |  | 2.6 |

*The amount and nature of the base was altered to obtain different pH's. With 2.6% MEA, pH = 8.0.

Track lubricant compositions were prepared from concentrates having a range of pH from 8.0 through 11.0, and applied to the test track in the manner previously described. The lubricity and durability of these compositions are set forth in Table II.

TABLE II

| Example | pH Concentrate Formula | pH 1:250 Soft Water Dilution | Durability | $\mu$ |
|---|---|---|---|---|
| A | 8.0 | 7.6 | 6.50 | 0.145 |
| B | 9.0 | 8.3 | 6.50 | 0.147 |
| C | 10.0 | 9.2 | 5.50 | 0.155 |
| D | 10.0 (KOH) | 9.2 | 4.01 | 0.147 |
| E | 11.0 (KOH) | 9.3 | 3.21 | 0.142 |

It can be noted that the coefficient of friction ($\mu$) stays relatively constant with increase in pH, and that durability decreases with further increase in pH. In certain applications, i.e., where the lubricant is applied substantially constantly to the conveyor track, a relatively low-level of durability may be satisfactory.

EXAMPLE XI

Resistance to beverage spills

The resistance of the lubricant compositions to acidic beverage spills such as those generally found in beer bottling halls was tested utilizing the formulation of Example X, partially neutralized with MEA and thereafter diluted with soft water (250:1) to a pH of 7.8.

Forty beer bottles were placed on the clean pilot test track and the test track apparatus adjusted as previously outlined. In an effort to simulate a heavily used track surface as found in a commercial bottling facility, the track was operated at a speed of 40 cm/sec. for a period of two hours with lubricant supplied throughout at a rate of 41 mL/minute.

At the end of the two hour equilibration period, with the track and the lubricant-feed still running, the effect of eight test bottles interconnected with a precision load cell was measured for 4½ minutes. The equilibrium coefficient of friction was found to be $\mu=0.154$.

After the above equilibrium measurement was completed, the flow of lubricant to the track was supplemented with a spray of water to determine the effect of dilution on the lubricant composition. Water was sprayed onto the track through a nozzle, upstream of the eight-bottle load, at a rate of 103 mL/minute using a peristaltic pump. Measurements were taken over a 4½ minute period and the water-dilution coefficient of friction was found to be $\mu=0.159$. Flow of water was stopped and the coefficient of friction was again measured over a period of 4 minutes: $\mu=0.159$.

The effect of a beer spill was determined by applying a supplemental spray of beer (pH 4.1) to the track in the same manner as the water spray in the preceeding water-dilution step, but at a rate of 55 mL/minute. The pH of the combined beer and lubricant spray on the track was determined to be pH=4.5. The coefficient of friction, measured over a 7 minute period, was observed initially to rise ($\mu=0.167$) and then to fall ($\mu=0.159$). Thereafter, the spray of beer to the test track was stopped and the lubricant alone applied. The lubricity was found to increase somewhat ($\mu=0.152$).

What is claimed:

1. In a method for lubricating a continuously-moving conveyor system for transporting packages from a first station to a second station and wherein said packages are temporarily detained at said first station while said conveyor moves beneath said packages, and said conveyor system is wetted with an aqueous lubricant composition; the improvement wherein said aqueous lubricant composition comprises:

A. a phosphate ester component consisting essentially of:
   (i) 51 to 100 percent by weight of a mono alkyl phosphate ester of the formula

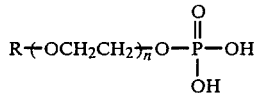

(ii) 0 to 49 percent by weight of a dialkyl phosphate ester of the formula

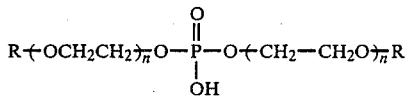

wherein the concentration of said phosphate ester component in said lubricant composition is in the range $1.0 \times 10^{-3}$ to $3.0 \times 10^{-3}$ molar;

B. a synergist component selected from the group consisting of:
   (i) an alcohol of the formula

(ii) an amine oxide of the formula

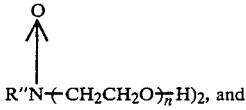

(iii) urea, said synergist present in an amount between 10 and 150 percent of the weight of said phosphate ester component;
   wherein m and n can have a value of zero through three, R and R' are selected from the group consisting of (i) linear saturated primary alkyl groups, $C_{14}$ through $C_{18}$, (ii) linear partially unsaturated primary alkyl groups $C_{16}$ through $C_{20}$, and (iii) a mixture of linear saturated primary alkyl groups $C_{12}$ through $C_{20}$, wherein the average length of the alkyl substituant is $C_{13}$ through $C_{18}$, and R" is a mixture of saturated and unsaturated alkyl groups $C_8$ through $C_{18}$ having an average chain length $C_{12}$ through $C_{18}$; and
   said lubricant composition being at least partially neutralized with a base whereby its pH is in the range 5.0 through 10.0.

2. A method according to claim 1 further including:
applying said lubricant compositions to said conveyor by means of a plurality of spray nozzles spaced along said conveyor system.

3. An Aqueous lubricant composition comprising:
A. a phosphate ester component consisting essentially of:
   (i) 51 to 100 percent by weight of a mono alkyl phosphate ester of the formula

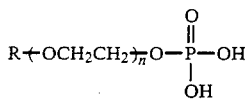

(ii) 0 to 49 percent by weight of a dialkyl phosphate ester of the formula

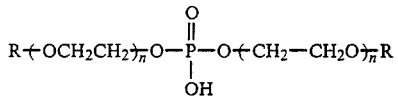

wherein the concentration of said phosphate ester component in said lubricant composition is in the range $1.0 \times 10^{-3}$ to $3.0 \times 10^{-3}$ molar;

B. a synergist component selected from the group consisting of:
(i) an alcohol of the formula

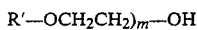

(ii) an amine oxide of the formula

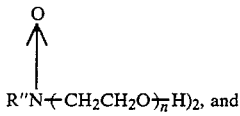

(iii) urea, said synergist present in an amount between 10 and 150 percent of the weight of said phosphate ester component;

wherein m and n can have a value of zero through three, R and R' are selected from the group consisting of (i) linear saturated primary alkyl groups, $C_{14}$ through $C_{18}$, (ii) linear partially unsaturated primary alkyl groups $C_{16}$ through $C_{20}$, and (iii) a mixture of linear saturated primary alkyl groups $C_{12}$ through $C_{20}$, wherein the average length of the alkyl substituant is $C_{13}$ through $C_{18}$, and R'' is a mixture of saturated and unsaturated alkyl groups $C_8$ through $C_{18}$ having an average chain length $C_{12}$ through $C_{18}$; and said lubricant concentrate being at least partially neutralized with a base whereby its pH is in the range 5.0 through 10.0.

4. An aqueous lubricant composition according to claim 3 wherein said base is selected from the group consisting of ammonia, ammonium hydroxide, or a water soluble amine.

5. An aqueous lubricant composition according to claim 3, further including an anionic surfactant.

6. The composition of claim 5 wherein said surfactant is the sodium salt of sulfonated oleic acid.

7. An aqueous lubricant composition according to claim 3, further including a sequestering agent.

8. An aqueous lubricant concentrate comprising:
A. a phosphate ester component consisting essentially of:
(i) 51 to 100 percent by weight of a mono aklyl phosphate ester of the formula

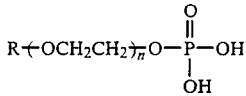

(ii) 0 to 49 percent by weight of a dialkyl phosphate ester of the formula

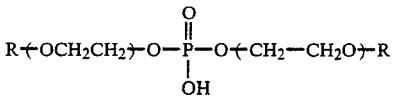

wherein the concentration of phosphate ester in said concentrate is in the range 0.2 to 0.5 molar;
B. a synergist component selected from the group consisting of:
(i) an alcohol of the formula

(ii) an amine oxide of the formula

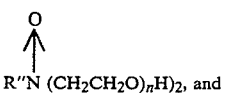

(iii) urea, said synergist present in an amount between 10 and 150 percent of the weight of said phosphate ester component;

wherein m and n can have a value of zero through three, R and R' are selected from the group consising of (i) linear saturated primary alkyl groups, $C_{14}$ through $C_{18}$, (ii) linear partially unsaturated primary alkyl groups $C_{16}$ through $C_{20}$, (iii) a mixture of linear saturated primary alkyl groups $C_{12}$ through $C_{20}$, wherein the average length of the alkyl substituent is $C_{13}$ through $C_{18}$, and R'' is a mixture of saturated and unsaturated alkyl groups $C_8$ through $C_{18}$ having an average chain length $C_{12}$ through $C_{18}$; and said lubricant concentrate being at least partially neutralized with a base whereby its pH is in the range 5.0 through 10.0.

9. An aqueous lubricant concentrate according to claim 8 wherein said base is selected from the group consisting of ammonia, ammonium hydroxide, or a water soluble amine.

10. An aqueous lubricant concentrate according to claim 8, further including an anionic surfactant.

11. The composition of claim 10 wherein said surfactant is the sodium salt of sulfonated oleic acid.

12. An aqueous lubricant concentrate according to claim 8, further including a sequestering agent.

13. A method according to claim 1 wherein the weight of the mono alkyl phosphate ester comprises at least 85 percent of the total weight of said phosphate ester component.

14. A lubricant composition according to claim 3 wherein the weight of the mono alkyl phosphate ester comprises at least 85 percent of the total weight of said phosphate ester component.

15. An aqueous lubricant concentrate according to claim 8 wherein the weight of the mono alkyl phosphate phospate ester comprises at least 85 percent of the total weight of said phosphate ester component.

* * * * *